US011162149B2

(12) United States Patent
Keller

(10) Patent No.: US 11,162,149 B2
(45) Date of Patent: Nov. 2, 2021

(54) REFINER FOR LACTOSE AND HIGH LACTOSE PRODUCTS

(71) Applicant: Keller Technologies, Inc., Marshfield, WI (US)

(72) Inventor: A. Kent Keller, Mantorville, MN (US)

(73) Assignee: Keller Technologies, Inc., Marshfield, WI (US)

( * ) Notice: Subject to any disclaimer, the term of this patent is extended or adjusted under 35 U.S.C. 154(b) by 381 days.

(21) Appl. No.: 16/305,787

(22) PCT Filed: May 30, 2017

(86) PCT No.: PCT/US2017/034949
§ 371 (c)(1),
(2) Date: Nov. 29, 2018

(87) PCT Pub. No.: WO2017/210162
PCT Pub. Date: Dec. 7, 2017

(65) Prior Publication Data
US 2020/0325549 A1   Oct. 15, 2020

Related U.S. Application Data

(60) Provisional application No. 62/344,203, filed on Jun. 1, 2016.

(51) Int. Cl.
*A23C 11/10* (2021.01)
*B01D 9/00* (2006.01)
(Continued)

(52) U.S. Cl.
CPC ............... *C13K 5/00* (2013.01); *A23C 11/10* (2013.01); *B01D 9/0045* (2013.01);
(Continued)

(58) Field of Classification Search
CPC ...... C13K 5/00; B01D 9/0045; B01D 9/0059; B01D 11/0257; B01D 11/0284;
(Continued)

(56) References Cited

U.S. PATENT DOCUMENTS 2,035,592 A * 3/1936 Christensen ....... B01D 11/0257
422/261
2,145,109 A * 1/1939 De Lisle .................. C13K 5/00
127/31
(Continued)

FOREIGN PATENT DOCUMENTS

CN   103801545 A   5/2014
EP   0005651 A1   11/1979

OTHER PUBLICATIONS

International Search Report and Written Opinion of counterpart international application PCT/US2017/034949, dated Aug. 11, 2017, 14 pgs.
(Continued)

*Primary Examiner* — Joseph W Drodge
(74) *Attorney, Agent, or Firm* — Shumaker & Sieffert, P.A.

(57) ABSTRACT

An example method for refining lactose may include washing lactose crystals in a lactose stream in an upstream wash stream including an upstream recirculating wash medium. Washed lactose crystals may be sieved from the upstream recirculating wash medium. The upstream recirculating wash medium may be recirculated back to the upstream wash stream. The washed lactose crystals may be discharged to a downstream wash stream comprising a downstream recirculating wash medium. An example system may include a plurality of refining stages. At least one refining stage may include a washing tank including a lactose crystal inlet and a crystal slurry outlet. The refining stage may include a pump to recirculate a wash stream from the crystal (Continued)

slurry outlet back to the washing tank at a predetermined flow rate. The refining stage includes a screen to separate washed lactose crystals from the wash stream.

16 Claims, 3 Drawing Sheets

(51) Int. Cl.

| | | |
|---|---|---|
| *B01D 11/02* | (2006.01) | |
| *B01D 21/26* | (2006.01) | |
| *B01D 36/00* | (2006.01) | |
| *B01D 37/00* | (2006.01) | |
| *C13K 5/00* | (2006.01) | |
| *B04B 5/06* | (2006.01) | |
| *B04C 5/26* | (2006.01) | |
| *B01D 11/00* | (2006.01) | |

(52) U.S. Cl.
CPC ........ *B01D 9/0059* (2013.01); *B01D 11/0257* (2013.01); *B01D 11/0284* (2013.01); *B01D 21/262* (2013.01); *B01D 36/00* (2013.01); *B01D 37/00* (2013.01); *B01D 2011/002* (2013.01); *B04B 5/06* (2013.01); *B04C 5/26* (2013.01)

(58) Field of Classification Search
CPC .. B01D 2011/002; B01D 9/00; B01D 9/0077; B01D 2009/0086; B01D 11/02; B01D 11/028; B01D 11/0288; B01D 36/00; B01D 36/04; B01D 36/045; B01D 21/26; B01D 21/262; B01D 21/267; B01D 29/56; B01D 37/00; A23C 1/00; A23C 1/14; A23C 7/00; A23C 7/04; A23C 7/0406; A23C 9/14; A23C 11/10; A23C 2210/00; C07K 1/14; C07K 1/306; C07H 1/06; C07H 1/08; B04B 5/06; B04C 5/26

USPC ............ 23/295 R, 299; 210/194, 511, 512.1, 210/634, 787, 806; 127/15, 16, 31, 53, 127/55, 56, 58, 63; 426/431; 536/123.13, 127

See application file for complete search history.

(56) References Cited

U.S. PATENT DOCUMENTS

| | | | | |
|---|---|---|---|---|
| 2,323,077 | A * | 6/1943 | Peltzer | C08B 30/044 127/68 |
| 2,377,524 | A * | 6/1945 | Samson | B04C 5/26 209/729 |
| 2,439,612 | A * | 4/1948 | Peebles | C13K 5/00 127/31 |
| 2,555,211 | A * | 5/1951 | Wallace | A23C 9/146 127/31 |
| 2,555,212 | A * | 5/1951 | Wallace | C13K 5/00 127/31 |
| 2,555,213 | A * | 5/1951 | Wallace | C13K 5/00 127/31 |
| 2,743,999 | A * | 5/1956 | Binswanger | B03D 1/1468 423/201 |
| 2,768,912 | A * | 10/1956 | Peebles | C13K 5/00 127/31 |
| 2,840,524 | A | 6/1958 | Stavenger et al. | |
| 3,785,865 | A * | 1/1974 | Pollard | C13K 5/00 127/55 |
| 4,202,909 | A * | 5/1980 | Pederson, Jr. | A23C 9/1425 426/239 |
| 4,316,749 | A * | 2/1982 | Evans | C13K 5/00 127/31 |
| 4,342,604 | A * | 8/1982 | Evans | C13K 5/00 127/31 |
| 4,755,295 | A * | 7/1988 | Donhauser | C07C 51/43 210/512.2 |
| 4,960,525 | A * | 10/1990 | Dalby | B01D 9/004 210/788 |
| 6,548,099 | B1 * | 4/2003 | Baker | C07H 1/06 536/123.13 |
| 2014/0051850 | A1 * | 2/2014 | Styles | C07H 1/06 536/123.13 |

OTHER PUBLICATIONS

Paterson, "Production and Uses of Lactose," Chapter 4, Advanced Dairy Chemistry vol. 3: Lactose, Water, Salts and Minor Constituents, Third Edition, Springer, ISBN: 978-0-387-84864-8, 2009, 18 pp. (Applicant points out, in accordance with MPEP 609.04(a), that the year of publication, 2009, is sufficiently earlier than the effective U.S. filing date, so that the particular month of publication is not in issue.).
DataBase WPI/2017 Clarivate Analytics, Week 201455, XP-002772582, Thomson Scientific, May 21, 2014, 2 pp.
International Preliminary Report on Patentability from International Application No. PCT/US2017/034949, dated Dec. 13, 2018, 7 pp.
Intent to Grant dated Apr. 30, 2019, from counterpart European Application No. 17728430.4, 24 pp.

* cited by examiner

REFINER FOR LACTOSE AND HIGH LACTOSE PRODUCTS

This application is a national stage application under 35 U.S.C. § 371 of PCT Application No. PCT/US2017/034949, filed May 30, 2017, which claims the benefit of U.S. Provisional Patent Application No. 62/344,203, filed Jun. 1, 2016. The entire contents of each of PCT Application No. PCT/US2017/034949 and U.S. Provisional Patent Application No. 62/344,203 are incorporated herein by reference in their entirety.

BACKGROUND

The milk sugar lactose can be produced by concentrating cheese whey, deproteinized cheese whey or deproteinized skim milk, cooling the concentrate to force crystallization of the lactose, separating the crystals from the mother liquor, purifying the crystals through washing with water, and drying the washed crystals.

Lactose standards of identity may specify that a product stated to be lactose must contain less than a predetermined threshold of impurities, for example, less than 0.3% ash and less than 0.3% protein. Commercial markets for lactose may prefer a product that has even lower impurities, for example, less than 0.15% ash and less than 0.1% protein. In addition, there may be a commercial preference for a product that appears to be essentially white, as opposed to off-white or yellow.

SUMMARY

Lactose is typically produced from deproteinized cheese whey, whole cheese whey or deproteinized skimmed milk. Lactose crystals produced from any of the above sources may contain enough ash and protein to be unacceptable for many commercial applications and may not meet governmental standards of identity for lactose. Lactose crystals have a tendency to tenaciously adsorb riboflavin, which is present in milk products. Lactose crystals may exhibit a yellow color due to the presence of adsorbed riboflavin. This riboflavin may be removed from the crystal surface to produce white lactose. Therefore, lactose crystals may require refining to reduce the amount of riboflavin and impurities such as ash and protein.

Techniques in which purification is effected by multistage washing of lactose crystals and then separating lactose crystals from the washing medium by gravity settling, a portion of the wash medium is discharged with the washed lactose crystals as the partially washed lactose crystals are discharged downstream. The practice of transporting lactose crystals downstream using wash medium containing riboflavin and impurities limits the effectiveness of such gravity settling techniques. Example systems and techniques according to the disclosure can be used to refine lactose by washing lactose crystals in a system wherein the washed lactose crystals are accompanied downstream by a negligible amount, or substantially none, of the impurity containing wash medium.

In techniques in which the separation of lactose and impurities is performed using gravity settling, for example using hydrocyclones, substantial operator intervention may be required to maintain a preferred high density of crystals in the lactose stream leaving a refining range. Another example, based on density differences between lactose and impurities, is a gravity decanting system using a quiescent tank in which partially washed lactose crystals are pumped from the bottom of one stage of the washing system to a downstream stage and the supernatant overflows to an upstream stage. The aforementioned decanting system also requires considerable operator attention and/or a very high degree of automation to achieve a reasonable degree of effectiveness. Another example for decanting lactose uses a horizontal, solid-bowl decanter for decanting the wash medium from the lactose crystals. Such a system does not take advantage of the density differences between lactose and impurities or the difference in particle size between lactose crystals and impurities. Example systems and techniques according to the disclosure may be used to improve refining efficiency while reducing operator intervention. Thus, example systems and techniques according to the disclosure can be used to obtain lactose which meets the standards of identity for lactose while using a reduced amount of washing medium and a reduced amount of operator attention.

The disclosure describes an example technique for refining lactose. The example technique may include washing lactose crystals in a countercurrent wash system including an upstream recirculating wash medium and a downstream flow of lactose crystals. The lactose crystals may include lactose monohydrate crystals. The example technique may include sieving washed lactose crystals from the upstream recirculating wash medium. The example technique may include recirculating the upstream recirculating wash medium to the upstream wash recirculating stream. The example technique may include discharging washed lactose crystals, for example, at least partially washed lactose crystals, to a downstream wash stream comprising a downstream recirculating wash medium.

The disclosure describes an example system for refining lactose. The example system may include a plurality of refining stages configured to refine lactose crystals in a countercurrent washing system. At least one refining stage of the plurality of refining stages may include a washing tank, a pump, and a screen. The washing tank may include a lactose crystal inlet and a crystal slurry outlet. The pump may be configured to recirculate a wash stream from the washing tank back to the washing tank at a predetermined flow rate. The screen may be configured to separate partially washed lactose crystals from the wash stream. A downstream lactose crystal inlet of a downstream refining stage of a plurality of refining stages may be configured to receive washed lactose crystals from a respective upstream screen of an upstream refining stage of the plurality of refining stages.

The disclosure describes an example system for refining lactose. The example system may include a plurality of refining stages configured to refine lactose crystals in a countercurrent washing system. At least one refining stage of the plurality of refining stages may include a washing tank, a pump, and a screen. The washing tank may include a lactose crystal inlet, a crystal slurry outlet, and a fresh wash medium inlet. The pump may be configured to recirculate a wash stream from the washing tank back to the washing tank at a predetermined flow rate. The screen may be configured to separate partially washed lactose crystals from the wash stream. A downstream lactose crystal inlet of a downstream refining stage of a plurality of refining stages may be configured to receive washed lactose crystals from a respective upstream screen of an upstream refining stage of the plurality of refining stages.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Drawing Figures.

Figure 1:
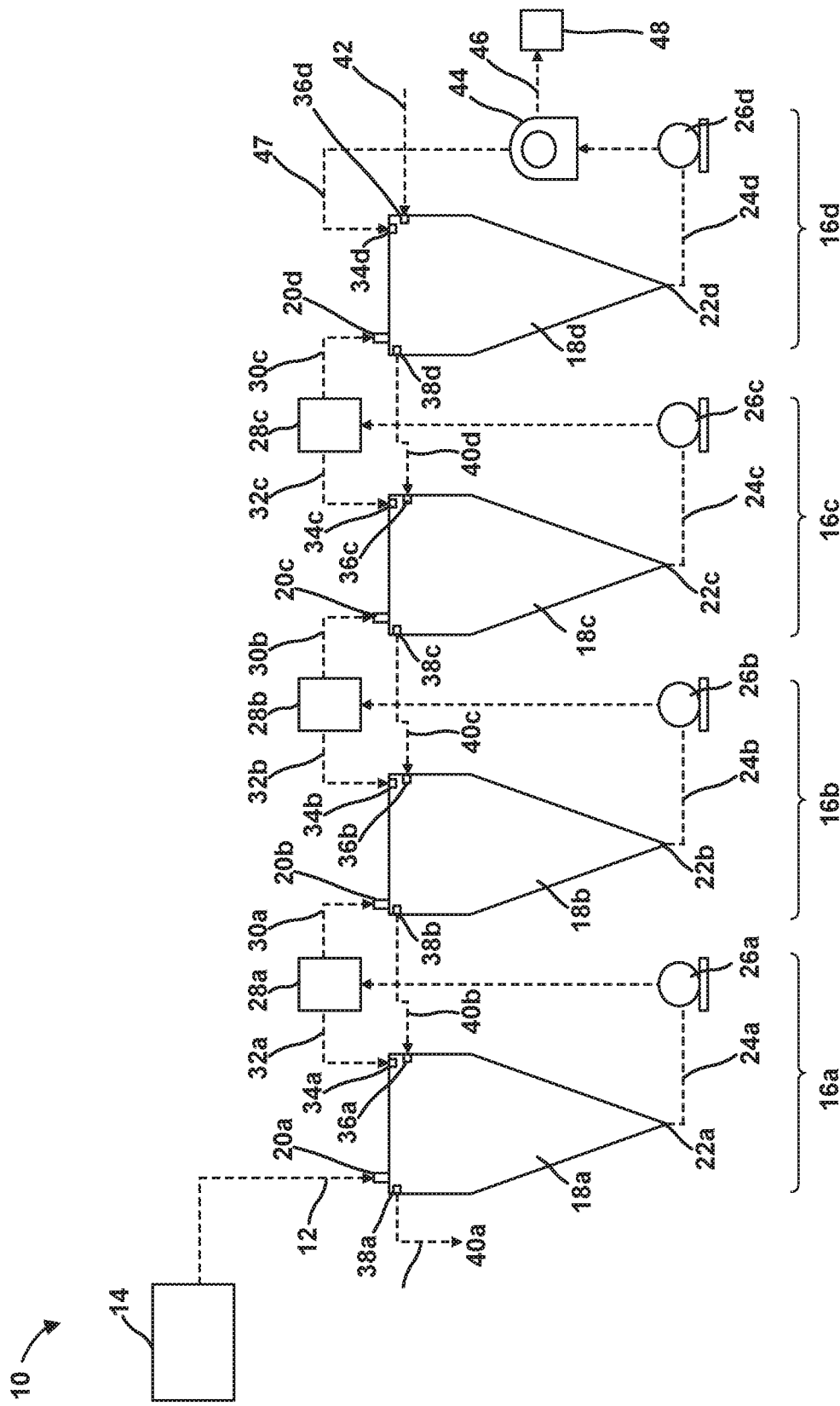
FIG. 1 is a schematic and conceptual block diagram illustrating an example system for processing and refining lactose.

It should be understood that the Figures present non-exclusive examples of the techniques disclosed herein.

DETAILED DESCRIPTION

Impure or low purity lactose may include impurities such as ash (for example, minerals) and protein. Impurities outside the lactose crystal may be removed by washing lactose crystals with a wash medium, for example, an aqueous liquid. Lactose crystals may be washed in a series of refining stages, to progressively increase the purity of lactose. With the density of impurities being less than the density of lactose crystals, lactose crystals tend to settle faster than the impurities. Thus, impurities can be separated from the lactose crystals by centrifugal settling. An example system for refining lactose may include one or more counter-current stages of hydrocyclones to remove the less dense impurities. However, such systems may require increased operator attention to adequately control the system to obtain the desired purity of lactose. Another example system may include quiescent settling instead of hydrocyclones.

However, hydrocyclone and quiescent settling systems discharge lactose between different refining stages as a slurry of lactose suspended in the wash medium. Since the wash medium includes the impurities being separated from the lactose crystals, some impurities are discharged downstream with the lactose crystals. This downstream transportation of impurities may ultimately limit the final purity of the downstream lactose product. Example settling systems for refining lactose may somewhat reduce such downstream discharge of wash medium by increasing the density of the crystal slurry, and therefore, the concentration of lactose relative to the impurities being pumped to the next stage. However, increasing the density of slurry requires greater operator intervention and/or increased automation to prevent plugging of the outlet of a given stage with lactose crystals.

In example systems and techniques according to the disclosure, impurities and the lactose crystals are discharged in opposite process directions. For example, washed lactose crystals of successively higher purity may be discharged downstream, while wash medium carrying successively higher concentration of impurities may be discharged upstream. Thus, the amount of wash water required to produce a given degree of purity may be reduced by reducing the amount of liquid carried with the lactose crystals to the downstream stage. Example systems and techniques according to the disclosure allow a greater tolerance for density variation and may reduce or avoid the need to control the density of slurry being pumped or discharged to the next refining stage. Thus, the amount of operator attention required to produce quality lactose may be reduced. Example systems and techniques according to the disclosure may also reduce retention times in the refiner system, reducing the potential for bacterial or microbial growth within the system. Example systems according to the disclosure may present a reduced physical footprint, for example, allowing for a more compact refining facility.

In some examples, the refining systems of this disclosure include screens to sieve or separate the wash medium, for example, water, from lactose crystals being discharged to the next or downstream refining stage. The wash medium that is separated from the crystals by the screen may be returned back to the refining stage from which the wash medium originated. Using screens to separate lactose crystals from the wash medium may be more cost effective than other means for separating lactose crystals, for example, centrifuging, hydrocycloning or gravity settling. Further, sieving a solid from a liquid, for example, of lactose crystals from wash medium by a screen may be easier to control and may require less operator intervention compared to other means for separating lactose crystals. For example, operator intervention may not be required even if the concentration or density of lactose crystals in the wash medium changes, for example, with different product streams, or during different stages of performing the process, for example, during start-up or shut-down.

In some embodiments, example techniques may allow substantially constant predetermined pumping rates between refining stages, reducing or avoiding the need to control crystal density of the process stream. This stream or slurry may be passed through a screen to separate lactose crystals from the wash medium. The wash medium may be returned to the washing tank from which it originated. The separated crystals are mixed in a mixing zone with washing medium flowing from a downstream stage. After the mixture leaves the lower portion of the mixing zone, the wash medium flows slowly upward to the wash overflow outlet; and the crystals descend to the stage's crystal slurry outlet. Given the difference in density between the impurities and lactose crystals, the impurities are partially fractionated from the lactose crystals. The washed lactose crystals settling to the bottom may be pumped out as a slurry or stream of lactose crystals carried in the wash medium. Thus, example techniques and systems according to the disclosure may substantially reduce the amount of wash medium flowing downstream with lactose crystals by substantially sieving the wash medium from the lactose crystals and returning the wash medium upstream instead of requiring a significant portion the wash medium to be used to transport the lactose crystals downstream.

FIG. 1 is a schematic and conceptual block diagram illustrating an example system 10 for processing and refining lactose. Example system 10 may include a lactose stream 12 originating from a crystal source 14. In some examples, lactose stream 12 may originate from a lactose crystallizer. In some examples, lactose steam 12 may originate from a device designed to partially separate lactose crystals from the associated mother liquor. Such devices may include hydrocyclones, solid bowl decanters or screening centrifuges. The products from which lactose crystals in lactose stream 12 are obtained may include a concentrated form of a dairy composition, such as cheese whey or a whey composition where a portion of the protein has been removed, such as via microfiltration, ultrafiltration, centrifugation, cyclone separation, or other clarifying or concentration processing, or a dairy composition produced from milk processing, cheese manufacturing, cream cheese manufacturing, cottage cheese manufacturing, or yogurt manufacturing. Lactose stream 12 may include lactose, for example, lactose powder or lactose crystals. The lactose crystals may include lactose monohydrate crystals. In some examples, lactose stream 12 may include lactose crystals suspended in a medium, for example, water. In some examples, lactose stream 12 may include lactose which has been partially purified by another process. For example, lactose stream 12 may include at least 70% lactose, or at least 75% lactose, or at least 80% lactose, or at least 90% lactose, or at least 95% lactose. In some examples, lactose stream 12 may include low grade lactose to be further refined by system 10 into higher grade lactose. Lactose stream 12 may include impurities, for example, one or more of ash, protein, glucose, galactose, lactic acid and riboflavin. Example system 10 may refine lactose stream 12 by reducing the concentration of impurities in lactose stream 12 to ultimately generate lactose of a predetermined purity by refining lactose stream 12 in a plurality of refining stages.

System 10 may include a plurality of refining stages 16a, 16b, 16c, and 16d. While four refining stages are shown in example system 10 of FIG. 1, in various embodiments the system 10 may include an amount of refining stages sufficient to generate lactose of a predetermined purity. In some embodiments, which are not intended to be limiting, the system 10 may include 1 to 20 refining stages, 2 to 10 refining stages, or 4 to 8 refining stages.

Each refining stage of the plurality of refining stages, for example, refining stages 16a, 16b, 16c, and 16d, includes a respective washing tank, for example, washing tank 18a, 18b, 18c, and 18d. In some examples, each respective washing tank 18a, 18b, 18c, and 18d may optionally include elements that promote mixing, agitation, or washing of lactose crystals by wash medium, for example, a mixing zone, one or more of baffles, agitators, or impellors. Each respective washing tank 18a, 18b, 18c, and 18d may include a respective lactose crystal inlet 20a, 20b, 20c, and 20d, and a respective crystal slurry outlet 22a, 22b, 22c, and 22d. Lactose crystals, for example, lactose crystals in a slurry, wash medium, or a lactose process stream, may be introduced at lactose crystal inlets 20a, 20b, 20c, and 20d.

Lactose crystals introduced into washing tanks 18a, 18b, 18c, and 18d may be washed in washing tanks 18a, 18b, 18c, and 18d by a wash medium. In some examples, the wash medium may include water, or an aqueous liquid. In some examples, the wash medium may be recycled or recirculated from other stages of system 10, and include some impurities. In some examples, the wash medium may be combined with fresh wash medium including substantially no impurities. In some examples, the wash medium may be sufficiently cold to prevent dissolution of lactose crystals into the wash medium. For example, the fresh wash medium may be added at a temperature less than about 40° C., or less than about 30° C., or less than about 20° C., or less than about 10° C., or less than about 1° C. Higher medium temperatures tend to improve lactose color while lower medium temperatures tend to improve lactose yield.

In some examples, because impurities may have a lower density than lactose crystals, lactose crystals may tend to settle to or remain at the bottom of washing tanks 18a, 18b, 18c, and 18d, while impurities may tend to rise or remain at the top of washing tanks 18a, 18b, 18c, and 18d. Washed lactose crystals, for example, lactose crystals at the bottom, may be removed from washing tanks 18a, 18b, 18c, and 18d through respective crystal slurry outlets 22a, 22b, 22c, and 22d. Wash streams 24a, 24b, 24c, and 24d may include washed lactose crystals carried or suspended in the wash medium. In some examples, wash streams 24a, 24b, 24c, and 24d may include substantially none, or a reduced concentration of impurities, compared to a concentration of impurities in lactose streams received at lactose crystal inlets 20a, 20b, 20c, and 20d.

In some examples, a slurry, paste, suspension, or a wash streams 24a, 24b, 24c, and 24d may be pumped from respective crystal slurry outlets 22a, 22b, 22c, and 22d by respective pumps 26a, 26b, 26c, and 26d. Pumps 26a, 26b, 26c, and 26d may include positive displacement pumps, centrifugal pumps, lobe pumps, peristaltic pumps, or other pumps suitable for pumping crystal slurries.

Thus, in some examples, at least one refining stage (for example, one or more of refining stages 16a, 16b, 16c, and 16d) of the plurality of refining stages may include a washing tank (for example, washing tanks 18a, 18b, 18c, and 18d) including a lactose crystal inlet (for example, lactose crystal inlets 20a, 20b, 20c, and 20d) and a crystal slurry outlet (for example, crystal slurry outlets 22a, 22b, 22c, and 22d). In some examples, the at least one refining stage may include a pump (for example, pumps 26a, 26b, 26c, and 26d) configured to recirculate a wash stream (for example, wash streams 24a, 24b, 24c, and 24d) flowing from the crystal slurry outlet back to the washing tank at a predetermined flow rate. In some examples, the wash stream flow rate may be a substantially constant, predetermined flow rate. For example, each refining stage of the plurality of refining stages may have substantially the same predetermined flow rate of the wash stream, regardless of the density of the lactose crystals in the wash streams. In some examples, a substantially fixed pumping rate may therefore be used to recirculate the wash streams. In some examples, each refining stage of the plurality of refining stages may have different flow rates, with each respective flow rate being substantially a predetermined flow rate of the wash stream. For example, refining stage 16a may have a first predetermined recirculation flow rate, refining stage 16b may have a second predetermined recirculation flow rate, refining stage 16c may have a third predetermined recirculation flow rate, and refining stage 16d may have a third predetermined recirculation flow rate. In some examples, each respective predetermined recirculation flow rate may be substantially constant. In some examples, one or more refining stages may have substantially the same recirculation flow rate. The recirculation flow rate may be determined in terms of the volumetric flow rate or mass flow rate at crystal slurry outlets 22a, 22b, 22c, and 22d, or pumping rates, capacities, rotations per minute (rpm), or power at pumps 26a, 26b, 26c, and 26d.

At least one refining stage, for example, one or more of refining stages 16a, 16b, and 16c, may include a screen, for example, respective screens 28a, 28b, and 28c. Screens 28a, 28b, and 28c may be placed at any suitable location between crystal slurry outlets 22a, 22b, and 22c and wash inlets 34a, 34b, and 34c. For example, as shown in FIG. 1, screens 28a, 28b, and 28c are located between pumps 26a, 26b, and 26c and wash inlets 34a, 34b, and 34c. In some examples, one or more of screens 28a, 28b, and 28c may include at least one of a woven wire screen, a vibrating screen, a wedgewire screen, or a perforated substrate, for example, a perforated metal substrate. Screens 28a, 28b, and 28c may separate most of the lactose crystals from wash streams 24a, 24b, and 24c into washed lactose streams 30a, 30b, and 30c, and separated wash medium streams 32a, 32b, and 32c. In some examples, streams 24a, 24b, and 24c and respective streams 32a, 32b, and 32c may be considered to be respective recirculating streams associated with respective washing stages 16a, 16b, and 16c.

In some examples, at least a respective downstream lactose crystal inlet (for example, lactose crystal inlets 20b, 20c, or 20d) of a downstream refining stage (for example, 16b, 16c, or 16d) of the plurality of refining stages may be configured to receive washed lactose crystals from a respective upstream screen (for example, screen 28a, 28b, or 28c) of at least an upstream refining stage (for example, 16a, 16b, or 16c) of the plurality of refining stages.

For example, for any pair of refining stages, one may be an upstream refining stage, and the other may be a downstream refining stage. For example, refining stage 16a is upstream relative to each of refining stages 16b, 16c, and 16d; refining stage 16b is downstream relative to refining stage 16a, and upstream relative to both of refining stages 16c and 16d; refining stage 16c is downstream relative to both of refining stages 16a and 16b, and upstream relative to refining stage 16d, and 16d is downstream relative to each of refining stages 16a, 16b, and 16c.

In some examples, apart from the recirculating wash medium, one or more washing tanks may also receive wash medium from another washing tank, for example, from an overflow wash stream from another refining stage. In some examples, a respective upstream washing tank, for example, washing tank 18a, of the upstream refining stage, for example, refining stage 16a, is configured to receive at a respective overflow inlet, for example, an overflow inlet 36a, a downstream overflow wash stream, for example, downstream overflow wash stream 40b, from a respective overflow outlet, for example, an overflow outlet 38b, of a downstream washing tank, for example, washing tank 18b, of the downstream refining stage, for example, refining stage 16b. In some examples, washing tank 18b, of an upstream refining stage, for example, refining stage 16b, may be configured to receive at a respective overflow inlet, for example, an overflow inlet 36b, a downstream overflow wash stream, for example, downstream overflow wash stream 40c, from a respective overflow outlet, for example, an overflow outlet 36c, of a downstream washing tank, for example, washing tank 18c, of the downstream refining stage, for example, refining stage 16c. In some examples, washing tank 18c, of an upstream refining stage, for example, refining stage 16c, is configured to receive at a respective overflow inlet, for example, an overflow inlet 36a, a downstream overflow wash stream, for example, downstream overflow wash stream 40d, from a respective overflow outlet, for example, 38d, of a respective downstream washing tank, for example, washing tank 18d, of the downstream refining stage, for example, refining stage 16d. In some examples, one or more of wash inlets 34a, 34b, 34c, and 34d may be the same as respective overflow inlets 36a, 36b, 36c, and 36d.

In some examples, the plurality of refining stages 16a, 16b, 16c, and 16d may be configured to discharge the washed lactose crystals downstream and the overflow wash stream upstream. For example, washed lactose crystals may be discharged downstream along lactose streams 30a, 30b, 30c, and 30d, while overflow wash stream 40a, 40b, 40c, and 40d are discharged upstream, as shown in FIG. 1. In some examples, one or more downstream refining stages may be elevated relative to respective upstream refining stages so that the respective downstream overflow wash stream (for example, overflow wash stream 40b, 40c, and 40d) from the downstream refining stage (for example, refining stage 16b, 16c, and 16d) may be configured to flow to the upstream washing tank of the upstream refining stage.

In some examples, the plurality of refining stages includes a most upstream refining stage (for example, refining stage 16a) configured to discard a respective most upstream overflow wash stream (for example, overflow wash stream 40a) through a respective most upstream overflow outlet (for example, overflow outlet 38a) of a respective most upstream wash tank (for example, wash tank 18a) of the most upstream refining stage. In some examples, a most downstream wash tank (for example, wash tank 18d) may include a respective most downstream wash inlet (for example, wash inlet 36d) configured to receive a fresh supply of wash medium (for example, a supply of wash medium 42) and a respective most downstream lactose crystal inlet (for example, lactose crystal inlet 20d) configured to receive washed lactose crystals from at least one refining stage of the plurality of refining stages.

In some examples, system 10 may include a centrifuge 44 configured to receive and centrifuge washed lactose crystals, for example, from crystal slurry outlet 22d. Centrifuge 44 may separate wash stream 24d into a lactose product stream 46 and recirculating wash medium stream 47 that may be recirculated back to wash inlet 34d.

In some examples, system 10 may include a dryer configured to receive and dry washed lactose crystals, for example, lactose crystals in lactose product stream 46. The dryer may include a spray dryer, drum dryer, roll dryer, an air-lift dryer, fluid bed dryer, or any suitable dryer.

Thus, example system 10 may be used to refine lactose crystals into relatively higher grade lactose, for example, food grade lactose, or lactose having predetermined purity. In some examples, lactose produced by system 10, for example, in lactose product stream 46 may have less than 0.3% ash and 0.3% protein, or less than 0.15% ash and less than 0.1% protein. In some examples, lactose produced by system 10, for example, in lactose product stream 46 may appear substantially white or nearly white.

Figure 2:
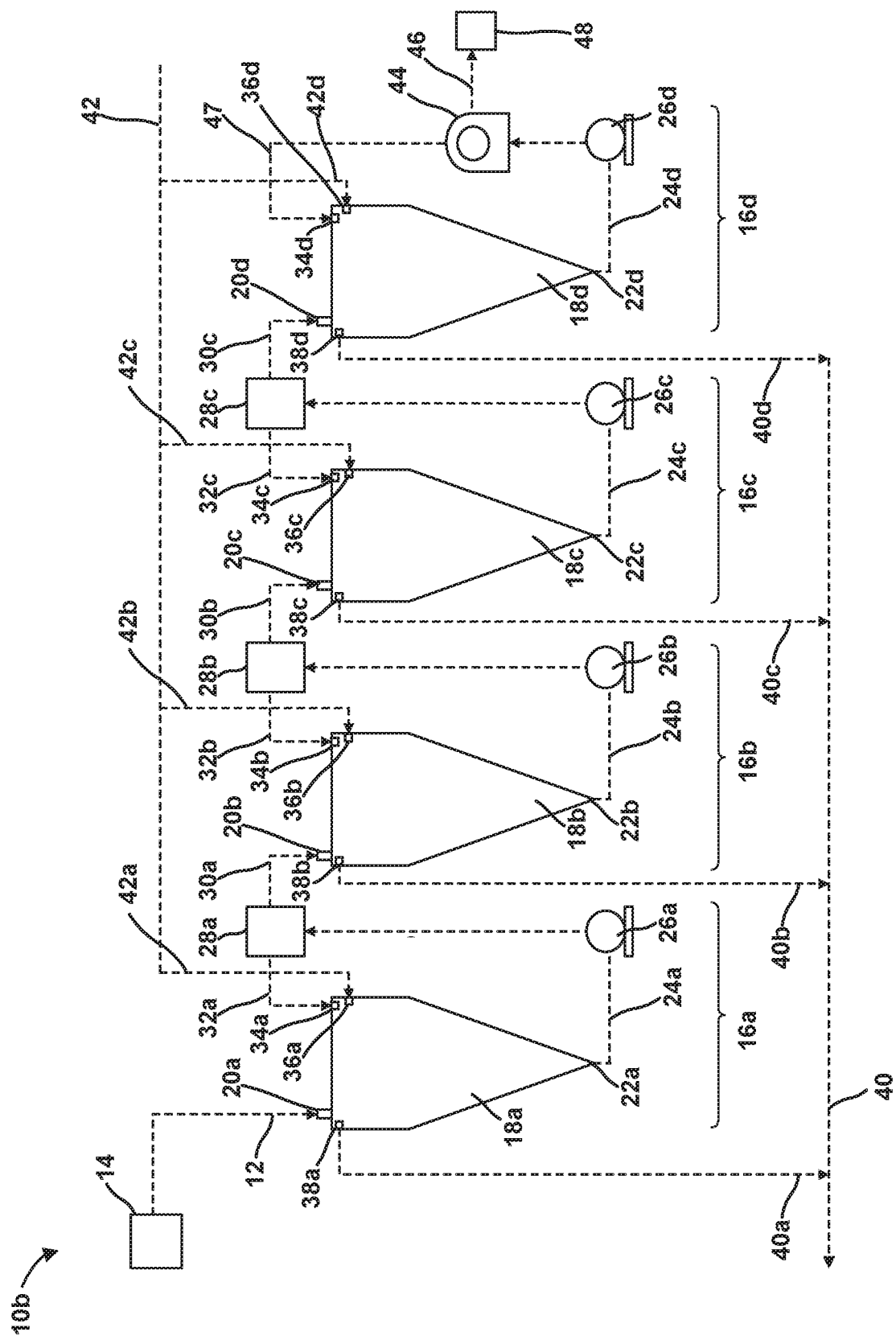
FIG. 2 is a schematic and conceptual block diagram illustrating an example system for processing and refining lactose, where fresh wash medium is supplied to at least one upstream refining stage.

While in example system 10 shown in FIG. 1, overflow wash medium is discharged upstream, for example, by overflow streams 40b, 40c, and 40d, in some examples, for example, example system 10b shown in FIG. 2, fresh wash medium may be supplied directly to one or more washing tanks. FIG. 2 is a schematic and conceptual block diagram illustrating example system 10b for processing and refining lactose, where fresh wash medium is supplied to at least one upstream refining stage. While system 10b includes refining stages 16a, 16b, 16c, and 16d similar to those described with reference to system 10 of FIG. 1, system 10b includes a fresh wash medium stream 42 divided into respective wash medium streams 42a, 42b, 42c, and 42d, respectively supplied to washing tanks 18a, 18b, 18c, and 18d, at respective inlets 36a, 36b, 36c, and 36d. Further, overflow streams 40a, 40b, 40c, and 40d from respective outlets 38a, 38b, 38c, and 38d may be combined into overflow stream 40. In some examples, overflow stream 40 may be discarded, or may be discharged to a stage of system 10b, or to a stage of another system, for example, to crystal source 14. In some examples, overflow stream 40 may be at least partially combined with fresh medium 42 and supplied back to one or more tanks 18a, 18b, 18c, or 18d.

One or more of lactose crystals, slurry, or wash medium in system 10 or system 10b may be discharged through pipes or ducts, for example, by pumps, by gravity, by pneumatic systems, or by any suitable means. Thus, example systems 10 or 10b may be used to refine lactose, for example, using example techniques described with reference to FIG. 3.

Figure 3:
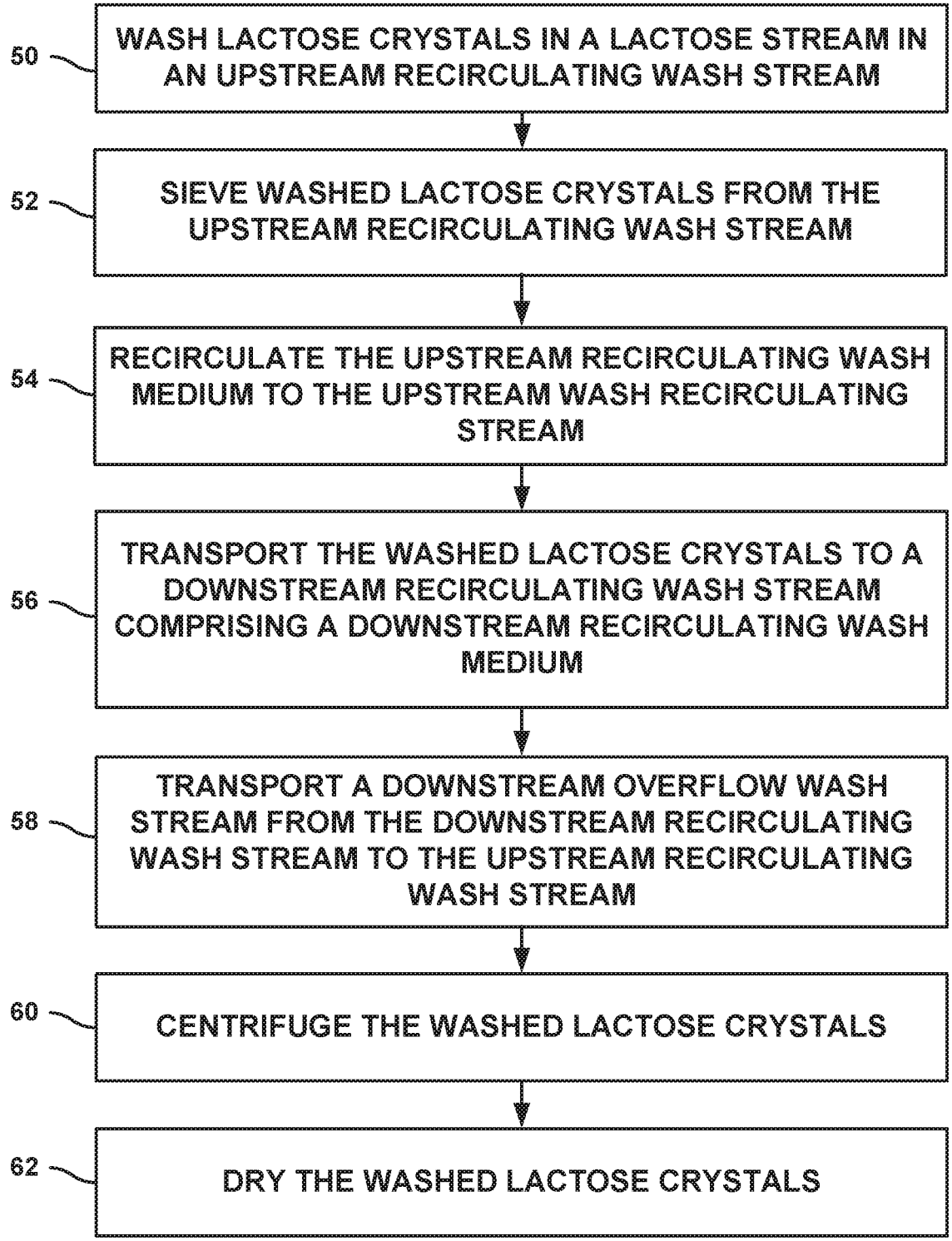
FIG. 3 is a flowchart illustrating an example technique for refining lactose.

FIG. 3 is a flowchart illustrating an example technique for refining lactose. The example technique may include washing lactose crystals in a lactose stream in an upstream wash stream (for example, wash stream 24b) comprising an upstream recirculating wash medium (for example, recirculating wash medium 32b) (50). The example technique may include sieving washed lactose crystals from the upstream wash stream (for example, at screen 28b) (52). In some examples, the example technique may include recirculating the upstream recirculating wash medium (for example, recirculating wash medium 32b) to the upstream wash recirculating stream (for example, wash recirculating stream 24a) (54). In some examples, the example technique may include discharging the washed lactose crystals to a downstream wash stream (for example, wash stream 24c in wash tank 18c) including a downstream recirculating wash medium (for example, recirculating wash medium 32c) (56). In some examples, the recirculating may include recirculating the upstream recirculating wash medium at a substantially constant predetermined flow rate.

In some examples, the sieving includes passing the upstream wash stream (for example, wash stream 24b) through a screen (for example, screen 28b) configured to separate wash lactose crystals from the wash medium (from example, from wash medium 32b in wash stream 28b).

In some examples, the example technique of FIG. 3 may include discharging a downstream overflow wash stream (for example, overflow wash stream 40c) from the downstream wash stream (for example, wash stream 24c) to the upstream wash stream (for example, wash stream 24b) (58).

In some examples, the technique of FIG. 3 may include discharging the lactose stream downstream and the overflow wash stream upstream. In some examples, the example technique may include discarding or recycling an upstream overflow wash stream. In some examples, the example technique may include supplying a fresh supply of wash medium to the downstream wash stream, for example, to wash stream 24c in refining stage 16c. In some examples, the example technique may include supplying a fresh supply of wash medium to the upstream wash stream, for example, to wash stream 24b in refining stage 16b.

In some examples, the example technique of FIG. 3 may include centrifuging the washed lactose crystals (60), for example, at centrifuge 44. In some examples, the example technique of FIG. 3 may include drying the washed lactose crystals (62), for example, at dryer 48.

While example techniques are described with reference to FIGS. 1 and 2, example techniques according to the disclosure may be implemented using other suitable systems. Thus, example systems and techniques according to the disclosure may be used to refine lactose while reducing operator intervention and avoiding downstream transportation of impurities.

Various examples of the invention have been described. These and other examples are within the scope of the following claims.

The invention claimed is:

1. A method comprising:
    washing lactose crystals in a countercurrent wash system comprising a series of washing tanks, each washing tank in the series of washing tanks comprising an upstream wash stream comprising an upstream recirculating wash medium and a downstream flow of lactose crystals; and for each washing tank,
    sieving washed lactose crystals discharged from the washing tank from the upstream wash stream to separate wash medium and lactose crystals from the upstream wash stream;
    recirculating the upstream recirculating wash medium to the upstream wash stream; and
    discharging the washed lactose crystals to a downstream wash stream comprising a downstream recirculating wash medium,
    wherein one or more downstream washing tanks in the series of washing tanks is elevated relative to a respective upstream washing tank in the series of washing tanks so that a downstream overflow wash stream from the downstream washing tank flows to a respective upstream washing tank.

2. The method of claim 1, wherein the sieving comprises passing the upstream wash stream through a screen configured to separate washed lactose crystals from the wash medium.

3. The method of claim 1, further comprising discharging a downstream overflow wash stream from the downstream wash stream to the upstream wash stream.

4. The method of claim 1, further comprising discarding or recycling an overflow wash stream from a most upstream washing tank in the series of washing tanks.

5. The method of claim 1, further comprising supplying a fresh supply of wash medium to the downstream wash stream.

6. The method of claim 5, further comprising supplying the fresh supply of wash medium to the upstream wash stream.

7. The method of claim 1, further comprising centrifuging the lactose crystals discharged from a most downstream washing tank in the series of washing tanks.

8. The method of claim 1, further comprising drying the lactose crystals discharged from a most downstream washing tank in the series of washing tanks.

9. A system comprising a series of refining stages to refine lactose crystals in a countercurrent washing system, each stage of the series of refining stages comprising:
    a washing tank comprising a lactose crystal inlet, a washing tank outlet, and a crystal slurry outlet,
    a pump configured to recirculate a wash stream from the washing tank outlet back to the washing tank at a predetermined flow rate, and
    a screen configured to separate washed lactose crystals from the wash stream, wherein a downstream lactose crystal inlet of a downstream washing tank is configured to receive washed lactose crystals from a respective upstream screen of an upstream washing tank, wherein one or more of the downstream washing tanks in the series of refining stages is elevated relative to a respective upstream washing tank in the series of refining stages so that a downstream overflow wash stream from the downstream washing tank flows to a respective upstream washing tank.

10. The system of claim 9, wherein the washing tanks discharge the washed lactose crystals downstream.

11. The system of claim 9, wherein a most upstream washing tank in the series of refining stages discards a wash stream through an overflow outlet.

12. The system of claim 9, further comprising a most downstream wash tank comprising a respective most downstream wash inlet configured to receive a fresh supply of wash medium and a respective most downstream lactose crystal inlet configured to receive washed lactose crystals from at least one refining stage of the plurality of refining stages.

13. The system of claim 9, comprising a centrifuge configured to receive and centrifuge lactose crystals discharged from a most downstream washing tank in the series of refining stages.

14. The system of claim 9, comprising a dryer configured to receive and dry lactose crystals discharged from a most downstream washing tank in the series of refining stages.

15. The system of claim 9, wherein at least some of the washing tanks in comprise a fresh wash medium inlet.

16. The system of claim 9, wherein each washing tank comprises a fresh wash medium inlet.

\* \* \* \* \*